Oct. 16, 1928.
J. MUIR
1,688,245
REMOVABLE EMANATION SEED
Filed Sept. 2, 1926  2 Sheets-Sheet 1
Fig. 1.
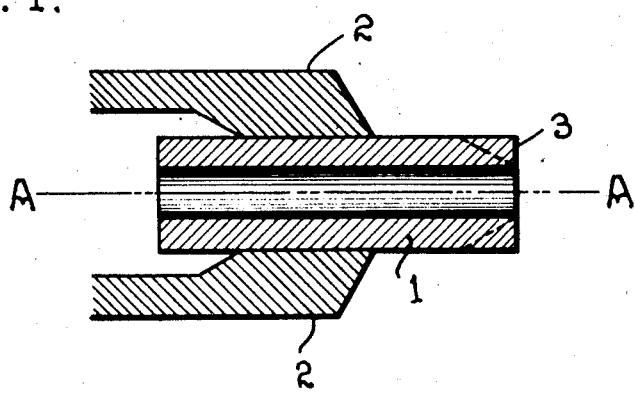
Fig. 2.
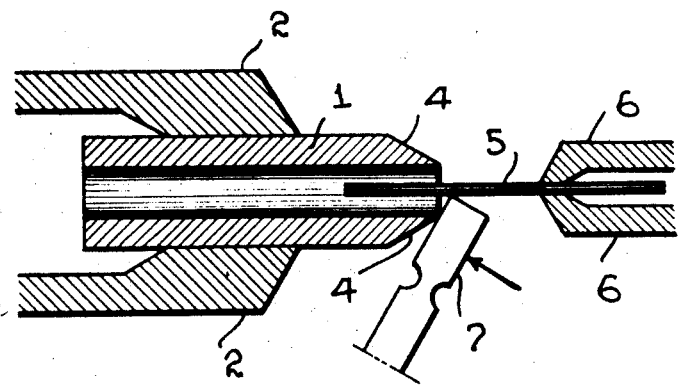
Fig. 4.
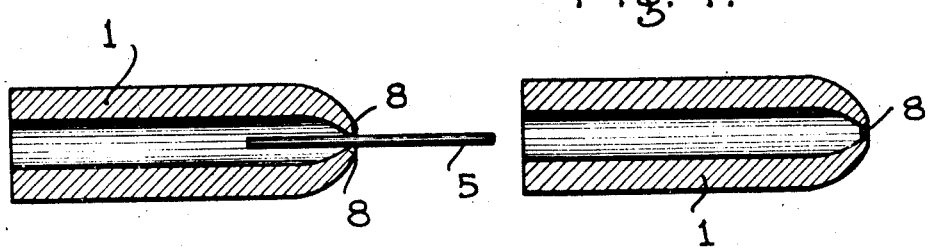
Fig. 3.
Inventor
JOSEPH MUIR.
By
Attorney Inventor,
JOSEPH MUIR
By Ivan P. Tashof,
Attorney Patented Oct. 16, 1928.

1,688,245

UNITED STATES PATENT OFFICE.

JOSEPH MUIR, OF NEW YORK, N. Y., ASSIGNOR TO THE RADIUM EMANATION CORPORATION, OF NEW YORK, N. Y., A CORPORATION OF DELAWARE.

REMOVABLE EMANATION SEED.

Application filed September 2, 1926. Serial No. 133,239.

My invention relates to the intratumoral radiation of tissue.

It has been customary to treat biological tissue with seeds or tubes containing radium emanation by placing the seed or seeds in the tissue and allowing the former to remain therein permanently. In a number of cases, there is no objection to permanently leaving the seeds in the tissue. However, in certain cases, it is highly objectionable to leave foreign bodies such as seeds in the tissue. It has been proposed to allow the seeds to remain in the tissue for a certain length of time, then open up or cut the tissue, thereafter remove the seeds, and then again close the tissue. Obviously, this practice is not desirable and in some cases, it is actually harmful.

Intratumoral radiation comprises radiation by burying the seeds in tissue so that preferably the seeds are completely surrounded by the tissue. The seeds may be buried in the diseased tissue, itself, or adjacent thereto.

I have found that intratumoral radiation may be successfully practiced by providing a removable seed carrying a permanent withdrawal member capable of being used in a seed implanter, especially of the type as set forth in the Muir application, Serial No. 47,101, filed July 30, 1925, and the Muir application, Serial No. 89,402, filed February 19, 1926. The invention contemplates the provision of a continuous seed, closed at its ends and containing radium emanation, the seed having a permanent withdrawal member attached thereto. By the term "permanent" it is desired to indicate that the thread or removal member is so attached to the seed as to not become separated therefrom when the seed is buried in the tissue. It is obvious that the thread may be attached to the seed by other means than those described which are intended as illustrative and not by way of limitation. The continuous seed may be made of metal or its equivalent which will function to absorb the undesirable rays. In the preferred form, the removable seed carrying the permanent withdrawal member is composite and comprises a metal tube enclosing a glass tube carrying radium emanation, the withdrawal member being permanently attached to the metal tube. In this preferred form the removable seed filters out the beta rays and allows the gamma rays to pass. The metal tube may be made of platinum, gold or alloys of either of said metals. It is desired to point out that my invention in one of its forms contemplates the provision of a tube made of a continuous piece of metal closed at both ends and having a permanent withdrawal or removal member attached thereto, said tube being capable of being used in a tube implanter as heretofore referred to. Tubes provided with a permanent withdrawal member can be implanted in deep seated lesions since they are adapted to be used with a seed implanter, whereby the seed may be implanted at any desired depth. In this connection it may be stated that deep seated lesions and superficial lesions are treated differently. Applicators may be applied to superficial lesions or to natural cavities, that is, hollow organs. However, tubes or seeds are used when it is desired to treat deep seated lesions which usually necessitate implantation by passing through healthy tissue. The provision of a continuous metal tube having both of its ends closed and having a permanent withdrawal member as a part thereof, enables the treatment of deep seated lesions without cutting the tissue, and the control of the amount of radium emanation applied to the lesion since the seed can be withdrawn at will, whereby the lesion is not subjected to the permanent presence of the seed. The removable seed may be economically made by the method hereinafter set forth.

In order that my invention may be clearly understood, it will be described in connection with the accompanying drawing in which:

Figure 1 is a cross section of the metal tube from which the finished seed is made together with a work holder therefor.

Figure 2 is a cross section of the metal tube with the ends filed down and held in a work holder together with a sizing wire and a burnisher.

Figure 3 is a cross section of the metal tube with one of its ends closed around the sizing wire.

Figure 4 is a cross section of the metal tube with the sizing wire removed.

Figure 5:
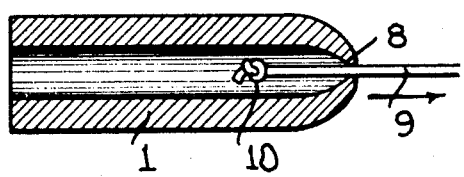
Figure 5 is a cross section of the metal tube with a thread therein.

Referring to Figure 1, the tube 1 is placed in a work holder 2 and rotated about the axis A—A. While rotating, end 3 of the tube 1 is filed, as shown by the dotted lines, to provide a conical surface 4. Into the open end 3 there is placed a wire 5, one end of the latter being held in the chuck 6. As the tube 2 is rotated, a burnisher 7 is pressed against the end of the tube 2, pressure being applied in direction of the arrow. As a result thereof, the conical surface 4 assumes the shape shown in Figure 3. The wire 5 is then removed from the tube 1, leaving the latter as shown in Figure 4. A suitable withdrawal member such as thread 9, for example a well waxed or paraffined silk thread, having a shoulder 10 which preferably is in the form of a knot, is then inserted through the aperture 8. The thread 9 is then pulled in the direction of the arrow until the shoulder 10 abuts against the interior curved end wall of the tube 1. In this manner a permanent withdrawal member 9 is formed.

Figure 6:
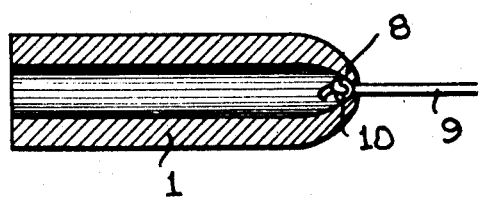
Figure 6 is a cross section of the metal tube with the thread in its final position just before the tube is charged with radium emanation and its open end closed.

The seed, as shown in Figure 6, may be charged with radium emanation through its open end and then closed.

Figure 7:
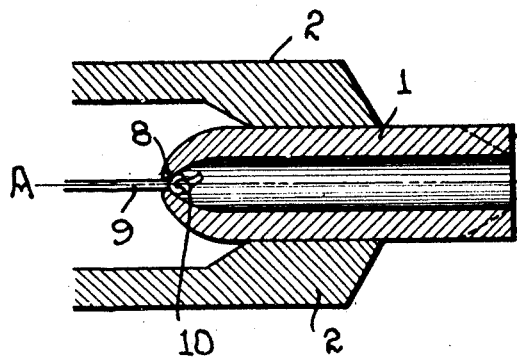
Figure 7 is a cross section of a metal tube carrying a permanent withdrawal member and held by a wire holder, the tube being ready to receive a glass emanation seed or container.
Figure 8:
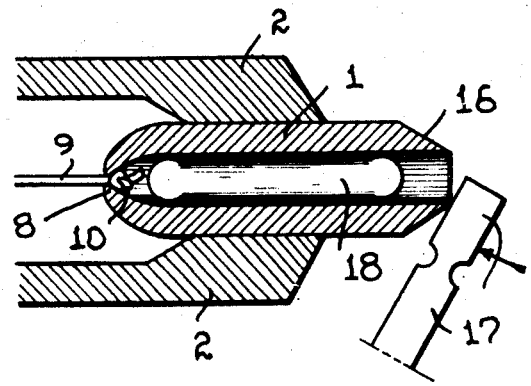
Figure 8 is a similar view, showing the glass emanation tube in position and the open end of the metal tube about to be closed.
Figure 9:
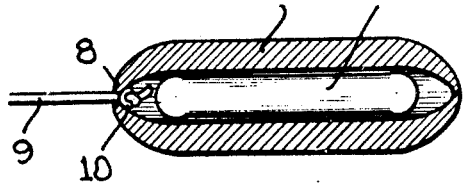
Figure 9 is a cross section of a finished composite emanation tube provided with a permanent withdrawal or removal member.
Figure 10:
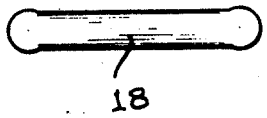
Figure 10 is a side elevation of a glass tube containing radium emanation.

A composite seed carrying a permanent withdrawal or removable member may be prepared as indicated in Figures 7, 8 and 9. The metal tube 1, shown in Figure 6, carrying any one of the removable members hereinafter referred to, is placed in the work holder 2, as shown in Figure 7 and rotated about the axis A—A. While rotating the end 15 the tube 1 is filed, as shown by dotted lines, to provide a conical surface 16, as shown in Figure 8. Thereafter, the work holder is stopped, and a glass emanation tube 18 containing radium emanation is introduced into the bore of the tube 1, as shown in Figure 8. The burnisher 17 is then brought against the filed end of the metal tube 1 and the tube is rotated about the axis A—A. By means of the burnisher 17 the pressure is applied in the direction of the arrow. As a result thereof, the conical surface 16 assumes the shape shown in Figure 9, thereby providing a finished and removable seed having a permanent withdrawal member ready for implantation in tissue through a seed implanter.

The withdrawal member 9 may be formed of any suitable material but, as indicated, a thread made of silk and well waxed or paraffined is preferred, satisfactory results having been secured with the same. Instead of using a waxed or paraffined thread, a permanent removable member, as follows, may be used. (a) A flexible metal wire using as a shoulder, a ball of fused metal at its end. (b) A flexible metal wire using as a shoulder, a hook at its end. (c) A flexible metal wire as part of the seed, soldered to its end. (d) A flexible metal wire as part of the seed, soldered to the metal tube. (e) A flexible metal wire as part of the seed thrust into the metal tube. This may be accomplished by placing a platinum tube in a work holder and then, while the tube is rotating, filing its open end. Thereafter a flexible metal wire with a small hook about 1 mm. in length is introduced into the bore of the tube for a distance of about .5 to 1 mm. A burnisher is then pressed sharply against the filed end of the tube so that the wire becomes embedded in the metal. In this manner the platinum is pressed around the wire and the contact made thereby is sufficiently strong to enable the wire to withstand an appreciable pull thereon. This method of securing the wire to the tube is based on the property of platinum being soft and malleable.

When using a waxed or paraffined withdrawal member, the shoulder or knot 10 should be well paraffined as this aids in forming an air-tight closure when the knot is brought against the curved end wall. As indicated, various equivalents of the paraffined thread may be used, provided they function to make the withdrawal member resistent to decay when left in the tissue.

Figure 11:
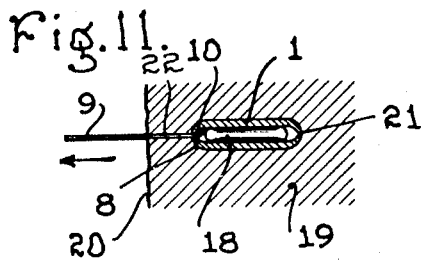
Figure 11 is a cross section through a removable composite seed implanted in tissue, the end of the tube carrying the attached thread or withdrawal member being nearer the surface of the tissue than the other end of the seed.

When a seed of the composite or non-composite type is placed in the tissue 19, the end 8 of the tube 1 to which the thread 9 is attached is nearer the tissue surface 20 than the other end of the tube 21. As shown in Figure 11, after the seed 1 has been placed in the tissue 19, the thread 9 appears above the tissue surface 20, coming out of the portal of entrance 22 made in inserting the seed in the tissue. After sufficient time has elapsed to give the desired dosage of radiation, the seed 1 may be removed by pulling the thread 9 in the direction of the arrow, as shown in Figure 11, and pulling the seed out of the tissue.

It is apparent from Figure 11 that the thread 9 protrudes from the tissue-surface 20, and indicates the position of the seed in the tissue. In other words, the protruding thread 9 acts as a guide in the implantation of successive seeds.

The advantages of the removable seed may be summarized as follows:

1. Seeds are removed after the proper amount of radiation has been delivered so that no objectionable foreign body is left permanently in the tissue.

2. If a seed causes infection it may be removed thus saving the patient from septicæmia.

3. If a seed is improperly implanted, its position may be corrected by removing the seed and reimplanting it at its proper place. This advantage may save the patient from a fatal operation.

4. High degree of accuracy of implantation is brought about through the protruding thread which serves as a guide in the implantation of successive seeds. The thread indicates at all times the exact position of implanted seeds, making it possible to successfully implant the seeds in the œsophagus, larynx and the lungs. In the bladder, this makes possible the implantation through the cystoscope with a high degree of accuracy, thereby saving the patient from an open operation.

5. One channel in the tissue may be radiated by one removable seed by implanting it deep and pulling it a definite distance at definite intervals.

I claim:

1. As a new article of manufacture, a seed closed at its ends and containing radium emanation, for intratumoral radiation of diseased tissue, and adapted to be buried in the tissue by a seed implanter, said seed having a withdrawal member attached thereto.

2. As a new article of manufacture, a metal seed containing radium emanation for intratumoral radiation of diseased tissue, and adapted to be buried in the tissue by a seed implanter, said seed consisting of a metal tube closed at both ends and having a withdrawal member attached thereto.

3. As a new article of manufacture, a seed containing radium emanation for intratumoral radiation of diseased tissue, and adapted to be buried in the tissue by a seed implanter, said seed being closed at its ends and having a withdrawal member attached thereto, the withdrawal member being resistent to decay when left in the tissue.

4. As a new article of manufacture, a composite seed for intratumoral radiation of diseased tissue, and adapted to be buried in the tissue by a seed implanter, comprising an inner tube containing radium emanation, an outer tube adapted to filter the beta rays emanating from the radium emanation, and a withdrawal member attached to said outer tube.

5. As a new article of manufacture, a composite seed for intratumoral radiation of diseased tissue, and adapted to be buried in the tissue by a seed implanter, comprising an inner tube containing radium emanation, a metal outer tube closed at both ends, adapted to filter the beta rays emanating from the radium emanation, and a withdrawal member attached to said outer tube.

6. As a new article of manufacture, a composite seed for intratumoral radiation of diseased tissue, and adapted to be buried in the tissue by a seed implanter, comprising an inner tube containing radium emanation, an outer metal tube closed at both ends, adapted to filter the beta rays emanating from the radium emanation, and a withdrawal member attached to said outer metal tube, said member being provided with a shoulder abuting against the withdrawal wall of the outer metal tube.

7. As a new article of manufacture, a composite seed for intratumoral radiation of diseased tissue, and adapted to be buried in the tissue by a seed implanter, comprising an inner tube containing radium emanation, an outer metal tube closed at both ends, adapted to filter the beta rays emanating from the radium emanation, and a withdrawal member comprising a waxed thread attached to said outer metal tube.

8. As a new article of manufacture, a composite seed for intratumoral radiation of diseased tissue, and adapted to be buried in the tissue by a seed implanter, comprising an inner tube containing radium emanation, an outer metal tube closed at both ends, adapted to filter the beta rays emanating from the radium emanation, and a withdrawal member attached to said outer metal tube, said member being resistant to decay when left in the tissue.

9. As a new article of manufacture, a seed containing radium emanation for intratumoral radiation of diseased tissue, and adapted to be buried in tissue by a seed implanter, said seed having a withdrawal member attached thereto.

10. As a new article of manufacture, a composite seed for intratumoral radiation of diseased tissue, and adapted to be buried in the tissue by a seed implanter, comprising an inner tube containing radium emanation, and an outer tube adapted to filter the beta rays emanating from the radium emanation, said seed having a withdrawal member attached thereto.

11. As a new article of manufacture, a composite seed for intratumoral radiation of diseased tissue, and adapted to be buried in the tissue by a seed implanter, comprising an inner tube containing radium emanation, and an outer metal tube adapted to filter the beta rays emanating from the radium emanation, said seed having a withdrawal member attached thereto.

12. As a new article of manufacture, a composite seed for intratumoral radiation of diseased tissue, and adapted to be buried in the tissue by a seed implanter, comprising an inner tube containing radium emanation, and an outer platinum tube adapted to filter the beta rays emanating from the radium emanation, said seed having a withdrawal member attached thereto.

13. As a new article of manufacture, a composite seed for intratumoral radiation of diseased tissue, and adapted to be buried in the tissue by a seed implanter, comprising an inner glass tube and an outer metal tube adapted to filter the beta rays emanating from the radium emanation, said seed having a withdrawal member attached thereto.

In testimony whereof I hereunto affix my signature.

JOSEPH MUIR.

CERTIFICATE OF CORRECTION.

Patent No. 1,688,245.             Granted October 16, 1928, to

JOSEPH MUIR.

It is hereby certified that error appears in the printed specification of the above numbered patent requiring correction as follows: Page 3, line 27, after the word "intervals" insert the words "This application is a continuation, in part, of Muir application, Serial No. 80,851, filed January 12, 1926"; and that the said Letters Patent should be read with this correction therein that the same may conform to the record of the case in the Patent Office.

Signed and sealed this 8th day of January, A. D. 1929.

(Seal)

M. J. Moore,
Acting Commissioner of Patents.